US006553376B1

(12) United States Patent  
Lewis et al.

(10) Patent No.: US 6,553,376 B1
(45) Date of Patent: Apr. 22, 2003

(54) EFFICIENT CONTENT SERVER USING REQUEST REDIRECTION

(75) Inventors: Kevin T. Lewis, Boston, MA (US); David L. Hoey, Wayland, MA (US)

(73) Assignee: InfoLibria, Inc., Waltham, MA (US)

( * ) Notice: Subject to any disclaimer, the term of this patent is extended or adjusted under 35 U.S.C. 154(b) by 0 days.

(21) Appl. No.: 09/440,975

(22) Filed: Nov. 16, 1999

Related U.S. Application Data (60) Provisional application No. 60/108,855, filed on Nov. 18, 1998.

(51) Int. Cl.[7] .......................... G06F 17/30; G06F 7/00
(52) U.S. Cl. ............................ 707/10; 707/1; 707/2
(58) Field of Search .................. 707/1–10, 100–104.1, 707/500–542; 709/200–203, 217–219, 226, 227–229

(56) References Cited

U.S. PATENT DOCUMENTS

| | | | | |
|---|---|---|---|---|
| 5,537,592 A | * | 7/1996 | King et al. ................... | 395/600 |
| 5,568,639 A | * | 10/1996 | Wilcox et al. ............... | 395/600 |
| 5,600,834 A | * | 2/1997 | Howard ........................ | 395/617 |
| 5,778,395 A | * | 7/1998 | Whiting et al. .............. | 707/204 |
| 5,787,470 A | * | 7/1998 | DeSimone et al. .......... | 711/124 |
| 5,806,078 A | * | 9/1998 | Hug et al. .................... | 707/511 |
| 5,873,097 A | * | 2/1999 | Harris et al. ................. | 707/203 |
| 5,896,506 A | * | 4/1999 | Ali et al. ................... | 395/22.43 |
| 5,940,594 A | * | 8/1999 | Ali et al. ................. | 395/200.33 |
| 6,029,175 A | * | 2/2000 | Chow et al. ................. | 707/104 |
| 6,205,481 B1 | * | 3/2000 | Heddaya et al. ............. | 709/226 |
| 6,067,567 A | * | 5/2000 | Bartfai et al. ................ | 709/211 |
| 6,076,105 A | * | 7/2000 | Wolff et al. .................. | 709/223 |
| 6,167,438 A | * | 12/2000 | Yates et al. .................. | 709/216 |
| 6,167,446 A | * | 12/2000 | Lister et al. ................. | 709/202 |
| 6,178,428 B1 | * | 1/2001 | Pystynen et al. ........... | 707/205 |
| 6,185,601 B1 | * | 2/2001 | Wolff ........................ | 709/105 |
| 6,317,778 B1 | * | 11/2001 | Dias et al. .................. | 709/214 |
| 6,405,252 B1 | * | 6/2002 | Gupta et al. ................ | 709/224 |
| 6,438,652 B1 | * | 8/2002 | Jordan et al. ................ | 711/120 |

FOREIGN PATENT DOCUMENTS

| | | | | |
|---|---|---|---|---|
| WO | WO 98/24208 | | 4/1998 | ........... H04L/12/54 |
| WO | WO 00/29990 | * | 5/2000 | ........... G06F/17/30 |

OTHER PUBLICATIONS

De Bra, P.M.E. and Post, R.D.J., "Information retrieval in the World–Wide Web: Making client–based searching feasible," *Computer Networks and ISDN Systems* 27:183–192 (1994). p. 183–192.

Mourad, A. and Liu, H., "Scalable Web Server Architectures," *Proceedings IEEE Symposium on Computers and Communications* (Jul. 1, 1997). p. 12–16.

* cited by examiner

Primary Examiner—Greta Robinson
Assistant Examiner—Linh Black
(74) Attorney, Agent, or Firm—Hamilton, Brook, Smith & Reynolds, P.C.

(57) ABSTRACT

A technique for optimizing delivery of specialized content files such as multimedia files in a computer network. A multimedia file cache is located at a point of presence, such as at an Internet Service Provider (ISP), gateway, or other place close to user connection points into the network. A redirection function intercepts media redirection file requests sent to or from the media server and rewrites such requests so that they point to the local media file cache.

35 Claims, 5 Drawing Sheets

FIG. 1

Here is a sample asx file; notice the redirection

```
<ASX VERSION="3">
<Title>Video 17Kbps/Audio 5Kbps</TITLE>
<AUTHOR>Microsoft Windows Media Technologies</AUTHOR>
<ABSTRACT>30fps Streaming Video!</ABSTRACT>

<ENTRY>

<ref href="mms://wmt.streamvision.com/msns/Clinton28.asf" />
<TITLE>Press Conference</TITLE>
<AUTHOR>Video Courtesy of CNN</AUTHOR>
<COPYRIGHT>? 1998 Cable News Network, Inc.</COPYRIGHT>
<MOREINFO href="http://www.cnn.com" />
<ABSTRACT>President Clinton Press Conference</ABSTRACT>

<ENTRY>

</ASX>
```

EFFICIENT CONTENT SERVER USING REQUEST REDIRECTION

CROSS-REFERENCE TO RELATED APPLICATION

This application claims the benefit of U.S. Provisional Application Serial No. 60/108,855 filed Nov. 18, 1998, the entire teachings of which are incorporated herein by reference.

FIELD OF THE INVENTION

This invention relates generally to content delivery in computer networks and in particular to a technique for selectively redirecting media content requests to local caches.

BACKGROUND OF THE INVENTION

During the twentieth century, continuous media services such as broadcast and cable television have become an ubiquitous vehicle for distributing entertainment, education, advertising, and other programs to the public. Emerging standards define new formats for television broadcast distribution in digital form. In addition, devices such as cable modems and Digital Subscriber Line (xDSL) modems are beginning to become available to the public. These products promise to provide a mix of access to television programming and high speed telecommunication services such as the Internet, which are increasingly looked to as vehicles which will augment traditional television broadcasts.

Indeed, these two content delivery systems, those optimized for television broadcast and those optimized for distribution of data content are merging. For example, standards such as the Motion Picture Experts Group (MPEG)-2 standard and other encoding schemes specify how video signals may be digitized for efficient transfer. Other efforts such as the Internet Engineering Task Force (IETF) audio/video transport (AVT) working group are developing specifications for realtime transmission of video over User Datagram Protocol (UDP) and Internet Protocol (IP) type layered networks such as the Internet. The vision is that in the future it will not be necessary to have an analog television within the home or at another cable subscriber site. In particular, video programs will routinely be broadcast in digital form as packetized data using UDP/IP or other data protocols.

In addition, with the growth of the Web and other activities on the Internet, it is increasingly important to find ways to efficiently manage a mix of text, graphics, and video data such as is associated with typical Web browsing activities. New techniques for specifying, handling, and distributing multimedia content such as contained in video clips are therefore needed.

In the context of the Internet and with the communication protocol known as Hypertext Transfer Protocol, a content file is typically specified by an alpha numeric string known as a Uniform Resource Locator (URL). The URL includes an address portion which indicates a network address of a home server from which to obtain the desired information. The URL also includes a local information text stream that identifies the requested information which may, for example, be a file name, a search request, or other identification.

After the user specifies a URL to the client browser computer, the address portion of the URL is sent over the network. Once the connection with the server is established, the client can then retrieve a desired document by passing the local information text stream over the network to the home server. The home server then retrieves the document from its local disk or memory storage and transmits the document over the network down to the client. The network connection between the home server and the client is then terminated.

However, an additional step is typically required in the context of streaming media files. For example, Microsoft has a set of multimedia technology tools for assisting with the creation of Web streaming media content. This tool set is an open, extensible platform that allows one to define a streaming media format file which makes it possible to combine a multitude of data types, such as audio, video, still images, URLs, etc. into an integrated data stream. One of the tools is a Microsoft Media Player tool that augments the capabilities of a Web browser to display multimedia content. Companies such as Apple Computer, RealNetworks, and Xing Technologies also provide standardized media players and streaming media file formats.

In the typical scenario, the user of a Web browser requests that a media stream file be downloaded, such as sending, in particular, the URL of a media redirection file from a Web server. The media redirection file (MRF) is a type of specialized Hypertext Markup Language (HTML) file that contains instructions for how to locate the multimedia file and in what format the multimedia file is in. The Web server returns the MRF file to the user's browser program. The browser program then reads the MRF file to determine the location of the media server containing one or more multimedia content files. The browser then launches the associated media player application program and passes the MRF file to it. The media player reads the MRF file to obtain the information needed to open a connection to a media server, such as a URL, and the required protocol information, depending upon the type of medial content is in the file. The streaming media content file is then routed from the media server down to the user.

SUMMARY OF THE INVENTION

The problem with standard techniques for handling media redirection files is that the media server must have a connection open to it for each browser which needs access to the streaming media content.

The present invention avoids this difficulty by deploying a multimedia cache and a cache redirector functionality within the network. In particular, the invention locates a multimedia cache at a point of presence, such as at an Internet Service Provider (ISP), at an intranet gateway, or at other places close to the edge of the network near the user. A redirector function allows requests for a multimedia program content to be redirected to the local media cache server instead of routing them up through the network. This rerouting is transparent to the operation of the media server as well as being transparent to the user's browser and media player programs.

Now more particularly, in a preferred embodiment, a user's browser program first requests a media redirection file (MRF) from an origin Web server. The Web server then returns the MRF file to the user's browser program. As in the prior art, the MRF file contains instructions for telling the browser where to locate the streaming media content file and what type of player program will be needed to view it. However, as the MRF file is returned from the media server, the cache redirector intercepts the MRF file before it is actually forwarded to the browser. The cache redirector examines the MRF file to determine if the requested multimedia content file is available in the local media cache. If so, then the designation in the MRF file is changed by the cache redirector to indicate the local media cache as the location of the requested media content. On a local cache miss operation, a request for the media file is launched to the indicated media server. In either event, the browser then opens the media player and the media player obtains the stream from the local media cache.

In the aforementioned arrangement, the cache redirector should maintain, or at least have access to, information concerning the contents of the local media cache. In particular, the cache redirector at a minimum has access to information as to what is contained in the media cache so that it can determine whether or not the media file being requested is already resident in the local media cache. The cache redirector may preferably also manage the media cache, telling it what content files to store and what to delete.

The media cache typically uses the same type of computing equipment as the media server, i.e., a high speed computer processor with high speed disk storage capable of managing connections to various network layers for a number of users. The media cache may support any number of different file formats such as Microsoft Media Technologies, Apple Computer, RealNetworks, Xing Technologies, or other types of streaming file formats.

The cache redirector can be a small network server (appliance) whose only function is media file redirection. The cache redirector watches packet traffic arriving at the point of presence, rewrites MRF files as needed, and keeps track of what is contained in the media cache. However, the cache redirector may also itself contain cache memory is for caching other types of content such as text files and the like.

In another embodiment of the invention, the cache redirector does not need to keep track of what is in the media cache itself. In this instance, the cache redirector communicates in some way with the media cache in order to be able to query it as to the media cache. In this scenario, the media cache itself is intelligent about storing streaming media content files.

The advantage of the foregoing arrangement is especially realized in environments where high speed modem equipment, such as Digital Subscriber Line (XDSL) or cable modem equipment, is deployed between the point of presence and the end users. While such equipment can run at speeds of 500 kilobits per second or more, the Internet itself can sometimes only provide 40 kilobits per second or even less per user connection. Thus, by placing the media cache with the media file redirection protocol at the edge of the network closest to the user, such as at a point of presence, streaming media files can be presented to users at the highest available data rates provided by their high speed interface equipment, without having to tolerate delays through the Internet.

Many types of specialized content files such as banner ads, streaming video clips, and the like can benefit from the deployment of a cache redirector and local cache server.

In an alternative embodiment, the media redirection file can instead be modified by the origin server. In this embodiment, the origin server has access to information concerning the address of media caches located at points of presence in the network. The net effect is that the cache redirector functionality is instead resident at the origin server, which modifies the MRF before it is passed to the user.

In yet another embodiment, a Directory Name Service (DNS) can be used to implement the cache redirection functionality. This embodiment may be preferred for networks where it is not possible to intercept traffic or modify origin servers. Specifically, a DNS for the network zone in question may be queried by the user when attempting to locate the MRF file or even the media file itself. In this embodiment, the DNS returns the address of the local media cache to the user.

It is also possible to pre-position media file content at the media cache servers. This helps expedite even the initial service of media files to users in a network zone for a given media cache.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
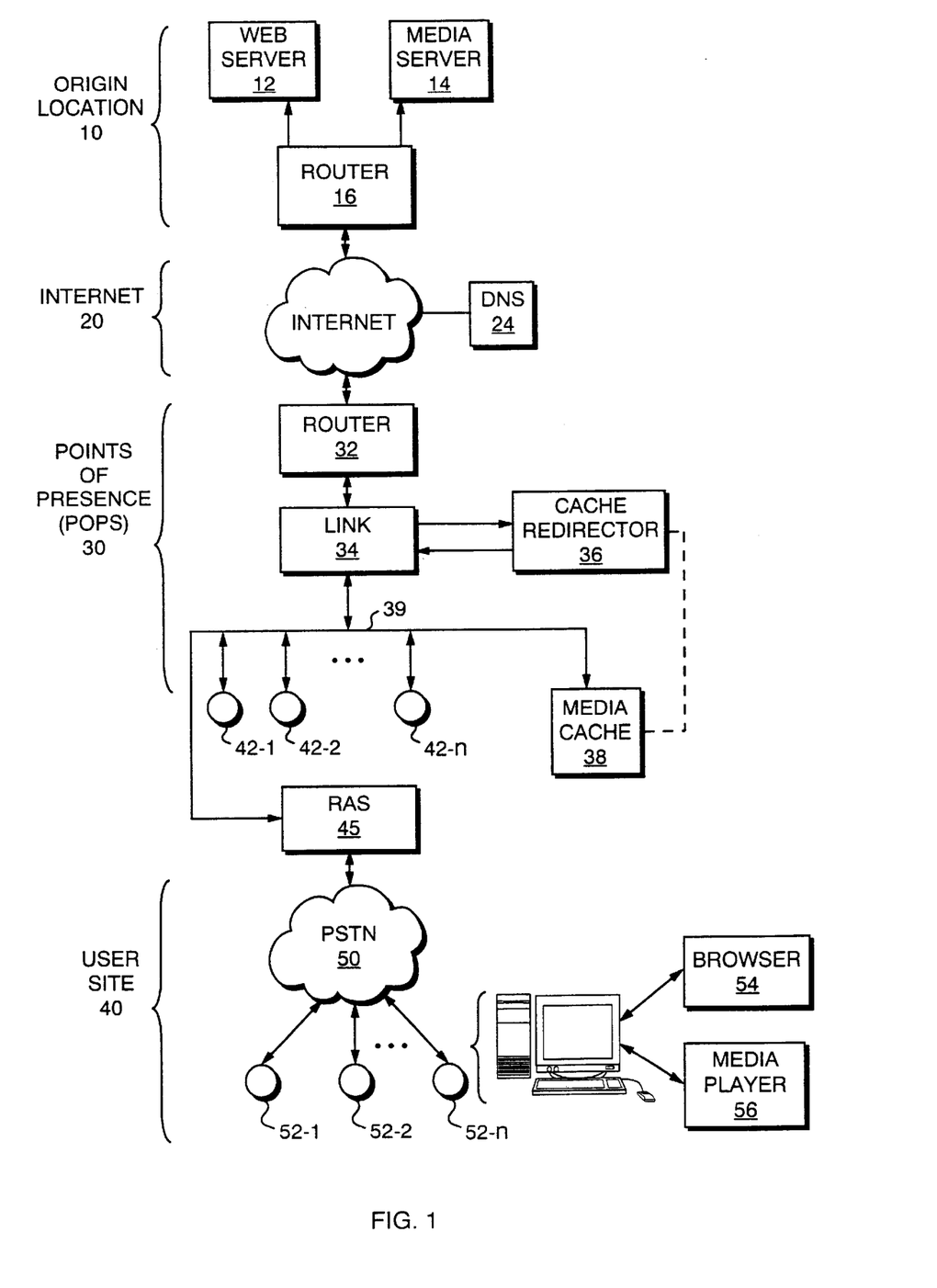
FIG. 1 is a system diagram of a computer network in which media request file redirection may be implemented according to the invention.

Turning attention now to the drawings more particularly, FIG. 1 is a system level diagram of a computer network in which media file requests are served according to the invention. As is typical in computer networks such as the Internet, a home or origin location 10 contains a number of computers. At certain points of presence (POPs) 30 in the network, additional computing and communications equipment permit the establishment of connections over the Internet 20 to other computers (known as clients) at a user site 40. The computers at the origin location 10 are typically referred to as servers. In the context of the Web, for example, one type of computer may be a Web server 12 that serves documents in the well known Hypertext Markup Language (HTML), or other formats. In this environment, the clients 40 run software that is enabled to interpret and display HTML files such as Web browsers like Netscape Navigator, or Microsoft Internet Explorer.

In the illustrated scenario, a media server 14 contains multimedia documents such as streaming audio or streaming video files that are associated with the Web server 12. The media server 14 is typically implemented with an architecture especially optimized for supporting the high speed presentation of such video and audio files. Both the Web server 12 and media server 14 make connections through a router 16 to provide such media files to client computers 40 connected to the Internet 20. Although the Web server 12 and media server 14 are shown as being colocated at the same site, it should be understood that they may be physically located at different sites.

At the point of presence 30, computing and communications equipment include a router 32, a link 34, a cache redirector 36, a media cache 38, and a local area network 39. The point of presence 30 may, for example, be an intranet gateway or an Internet service provider (ISP). In the former case, the end nodes 42 may be directly connected to the local area network 39. In the latter case, a Remote Access Server (RAS) device 45 provides communication connections through another network 50 such as the Public Switch Telephone Network (PSTN) to subscribers units 52 located, for example, within homes or businesses that make connections through a dial up network.

The remote access server 45 preferably makes use of high speed subscriber interconnection equipment such as Digital Subscriber Line (xDSL), cable modems, or other high speed interconnectivity devices. The remote access server 45 may, for example, be a xDSL multiplexer, cable modem head end, T1 converter, or other such equipment which concentrates Internet protocol (IP) type traffic and forwards it over connections such as the public switch telephone network or cable distribution network.

In accordance with the invention, also located at the point of presence 30 is a media cache 38. Media cache 38 is populated with media files that are most popularly requested by the users of the client computers 42 and 52. In general, the idea behind the present invention is that when a streaming media file request is made by one of the clients 42 or 52, steps are taken to ensure that the request is served from the media cache 38 located at the point of presence 30, as opposed to having to retrieve the requested streaming media file from the media server 14 on the other side of the Internet 20.

The present invention in particular operates in an environment where requests for media files are made in the form of redirection objects generated by the browser programs located at the clients 42, 52. In particular, the browser programs 54 located at the clients 42, 52 are typically not capable of directly displaying or playing streaming media files. In particular, the browser needs to open or "launch" an associated application such as a media layer program. One example of such a media player program which is well known in the art is the RealPlayer™ software available from RealNetworks of Seattle, Wash., or the Media Player™ software available from Microsoft Corporation of Redmond, Wash. Thus, when a media file is presented to the browser, the browser, strictly speaking, does not handle the media file but rather redirects the request for the file to an appropriate media player program 56.

As is known in the art, when one of the users of the client computers 42, 52 requests a media stream such as a video clip of a presidential news conference from a site such as www.cnn.com, the browser 54 makes a request for the media stream in the form of a file request using the hypertext transfer protocol (HTTP) for a media redirection file (MRF) from the Web server 12. The Web server 12 sends the MRF file down to the browser 54. The MRF file itself contains additional instructions for the type of media player 56 that is required to view the video clip, as well as instructions for where to locate the media stream itself. The requested media file may be a recorded clip or a live stream.

Figure 2:
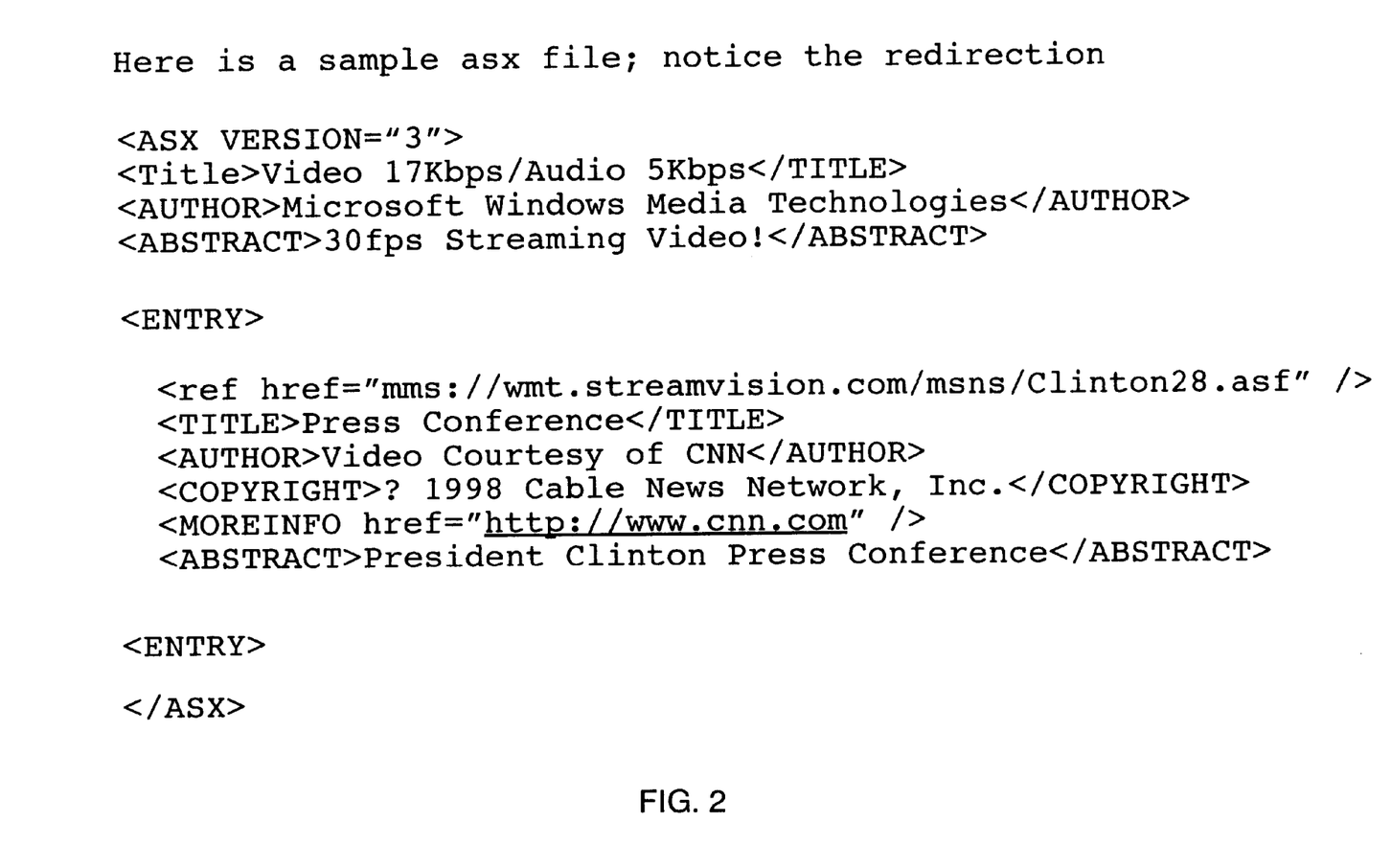
FIG. 2 is an example of a media request file in which a redirection takes place.

For example, turning attention to FIG. 2, there is shown one type of MRF file known as an Active Streaming Format (ASF) file formatted for a Microsoft Media Technologies type environment. As can be seen, the MRF file is similar to a HTML type file in that it is a tent file that contains tag portions. One of the tags contains an <href> type reference to a media file which can be obtained by using the "mms" protocol at the URL//wmt.streamvision.com/msns/clinton.28.asf. The <href> reference indicates that the desired streaming video file of President Clinton's news conference is in the ASF format and can be obtained at the indicated uniform resource locator (URL).

In the prior art, the MRF file is returned directly to the browser 54 which in turn causes the browser 54 to open the media player 56 program such as the associated Microsoft Media Player program at the user node 42, 52. The media player 56 then obtains the streaming media file indicated by the MRF file from the media server 14 by submitting another file request over the Internet 20. The streaming media file is then sent from the media server 14 to the media player 56.

Figure 3:
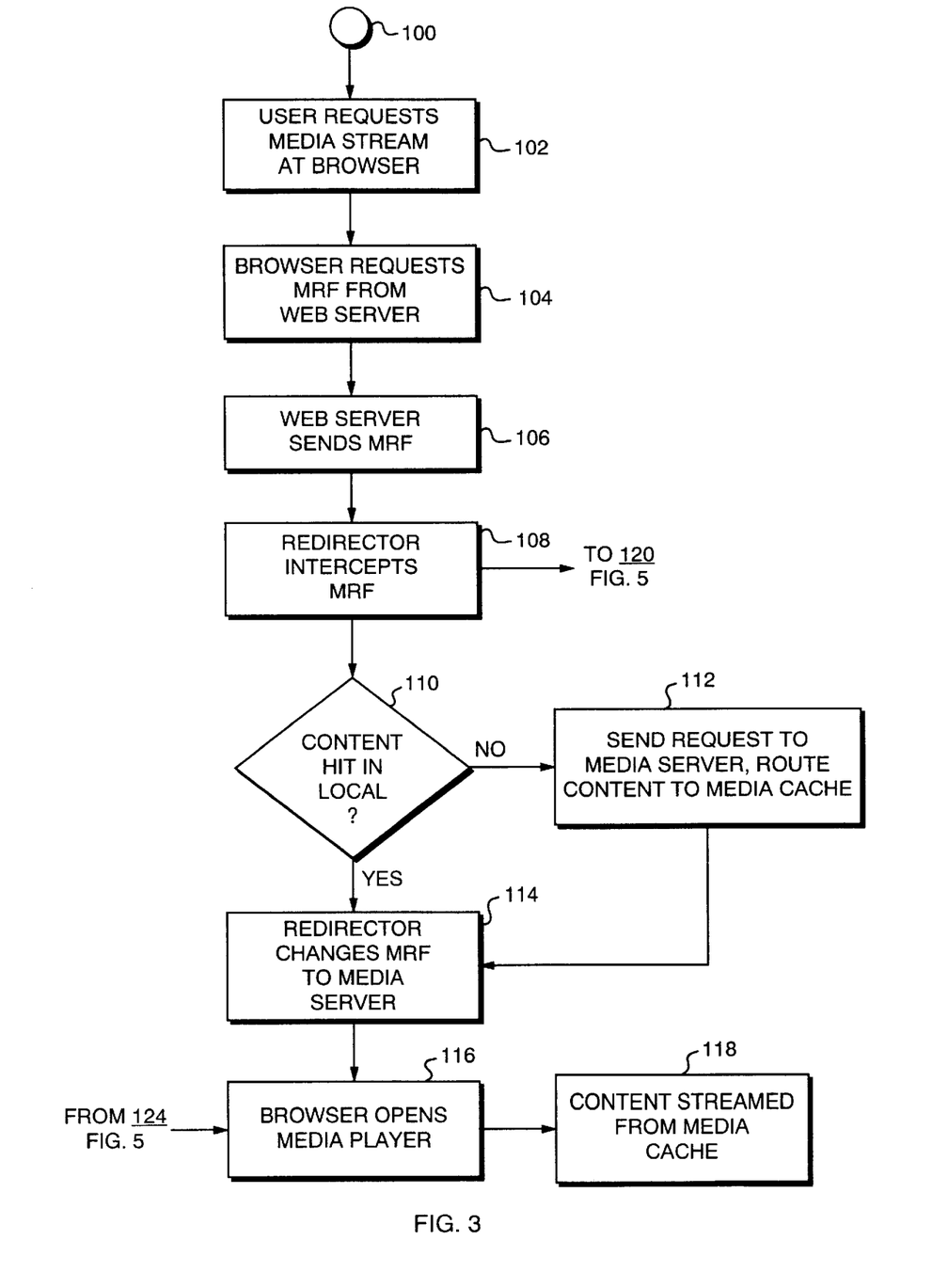
FIG. 3 is a flow diagram of the steps performed by various components of the network.

In accordance with a preferred embodiment of the invention, a different sequence of events occurs in order to maximize the speed at which the media file is made available to the clients 42, 52. As shown in FIG. 3, from an initial idle state 100, the first three steps occur as with the prior art. In particular, in state 102, the user makes a request for the streaming media file such as by specifying it at the browser 54 either by clicking on a hypertext link within a Web page, or by presenting the URL for the corresponding MRF file directly to the browser 54. In the next state 104, the browser program requests the MRF file from the Web server 12. In state 106, the Web server 12 then returns the MRF file through the Internet 20 in the direction of the client 42, 52.

However, in state 108, the link 34 and cache redirector 36 recognize and intercept the MRF file on its way through the Internet 20 towards the clients 42, 52. In a state 110, the cache redirector 36 thus determines whether or not a streaming file referenced by the MRF file is available in the local media cache 38. If it is, then processing continues to state 114. If it is not, however, then processing continues to a state 112 in which the redirector 36 sends a modified MRF request to the media server 14, requesting that the media file be instead sent to the media cache 38.

In any event, processing continues to a state 114 in which the redirector 36 changes the <href> reference within the MRF file before forwarding the MRF file to the users 52, 42. This modification by the redirector 36 inserts the URL of the media cache 38 into the MRF file so that the request will be serviced by the media cache 38 instead of the media server 14.

In state 116, the browser opens the media player program 56 and in state 118 the media player 56 obtains the information stream from the media cache 38.

The cache redirector 36 must know or have access to information indicating what is stored in the media cache 38. The cache redirector 36 may therefore actually be responsible for controlling what is stored in the media cache 38 and so must manage storage availability in the media cache 38 so that old or unused files are overwritten or deleted.

The cache redirector 36 can be implemented as a small server that watches traffic and intercepts MRF files, and the reroutes them as necessary to the media cache 38. The media cache may be, for example, a type of computing system known as a Media Server available from Microsoft or a Real Video Server available from RealNetworks.

It should be understood that there may be a number of rules to determine whether or not the cache redirector 34 actually causes the media cache 38 to serve the requested content. For example, such may be done upon recognizing multiple requests for the same content file.

It can now be appreciated that the invention provides certain advantages to optimize Internet access of media files. For example, in most scenarios, the highest data rates available to one of the clients 42 or 52 that accessing information over the Internet 20 is on the order of 40 kilobits per second (kbps). However, access equipment supported by the remote access server 45 is now being deployed which provides data rates which are much greater. For example, Digital Subscriber Line (xDSL) type equipment or cable modem equipment is capable of rates of 500 kilobits per second or more. The full advantage of such equipment cannot be realized given that the Internet 20 itself is only capable of rates which are much slower. Therefore, by building the media cache 38 into points of presence 30, and implementing media file request redirection, then the full advantage of the available bandwidth of DSL or cable modem connections can be taken advantage of when delivering streaming media files to the end users 42, 52. A service provider who deploys the media cache 38 in this manner many therefore charge extra for this service.

It should be understood that other embodiments of the cache redirector 36 are possible. For example, it is not necessarily required that the cache redirector 36 maintain control over the contents of the media cache 38. In particular, a high speed connection between the cache redirector 36 and media cache 38 may provide the ability for the cache redirector 36 in state 110 to determine the contents of the media cache 38 by query. The benefit of this arrangement is that the cache redirector 36 itself does not need to be as smart as a cache controller and the intelligence in the media cache controller can be built into the media cache 38 itself. However, the difference with this arrangement is that communication between the cache redirector 36 and media cache 38 must take place as to the content of the media cache. In addition, there is preferably some sort of latency built into the media cache 38 in this arrangement so that it when a query is made for particular content from the cache redirector 36, such locations are not overwritten for a period of time after such queries, with the assumption that the media content will shortly needed to be delivered to one of the clients 42, 52 after such a request.

The redirector function of step 114 may be physically deployed at the outer edge of the network such as at the point of presence 30 as shown. However, the redirector 36 may also be deployed at nodes within the network 20 itself, or even at the origin Web server 12.

In addition, a Directory Name Service (DNS) 24 is typically deployed in networks 20 such as the Internet to assist the browser 54 in resolving domain names to physical addresses. Thus, step 104 typically involves the browser requesting the DNS 24 to return an Internet Protocol (IP) layer address for the origin Web server 12 in the process of requesting the MRF file. The DNS 24 is again typically involved in step 116 when the modified MRF file is read by the browser to determine the location of the media content file.

Therefore, at either step 104 or step 116, the DNS 24 can, instead of returning the IP address of the Web server 12 or media server 14, be programmed to instead return the IP address of the local media cache 38. If this is done in step 104, the local media cache returns the MRF file to the user. If this is done at step 116, the local media cache 38 returns the requested media file.

Yet another variation takes advantage of the fact that the media caches 38 are mass storage devices. This scenario permits the pushing of content media files out to the local media caches 38 in anticipation of the browser 54 actually requesting a file. This pushing will work as long as the address specified in the MRF associated with the media file is changed in synchronism with the storing of content in the media cache 38.

The media cache 38 may also serve different versions of the media file based upon measured link bandwidth between the clients 42 or 52 and the cache 38. Specifically, when an MRF file is intercepted by the cache redirector 36, a link bandwidth determination may be made for the particular client 42 or 52 which made the request. A different media file may then be returned to the client depending upon the observed bandwidth. Quality of Service (QOS) enforcement mechanisms may then be used to ensure that the measured bandwidth remains available for the duration of the session.

In a further scenario, it is possible to avoid rewriting of the MRF file by the cache redirector 36. In particular, after state 106 in which the Web server returns the MRF file, the MRF file need not be immediately intercepted by the cache redirector 36. Rather, the MRF file can be allowed to return directly to the clients 42, 52. The browsers at the clients 42, 52 can then return a request for a file located at the media server 14. However, at this point, the cache redirector 36 makes use of techniques such as the link layer redirection technique referred to in our co-pending patent application Ser. No. 09/040,519 entitled "Message Redirector with Cut-Through Switch for Highly Reliable and Efficient Network Traffic Processor Deployment," assigned to InfoLibria, Inc., the entire contents of which are hereby incorporated by reference. In this instance, the user's request to the top level media server 14 is instead intercepted by a link layer redirection capability of the cache redirector 36. Within the clients 42, 52, a port connection may be redirected or spoofed, such as at the link layer, and this capability routes any request to the media server 14 instead to the local media cache 38. The link layer redirection capability within the cache redirector 36 in this instance needs to keep track of the contents of the media cache 38 and media server 14.

Figure 4:
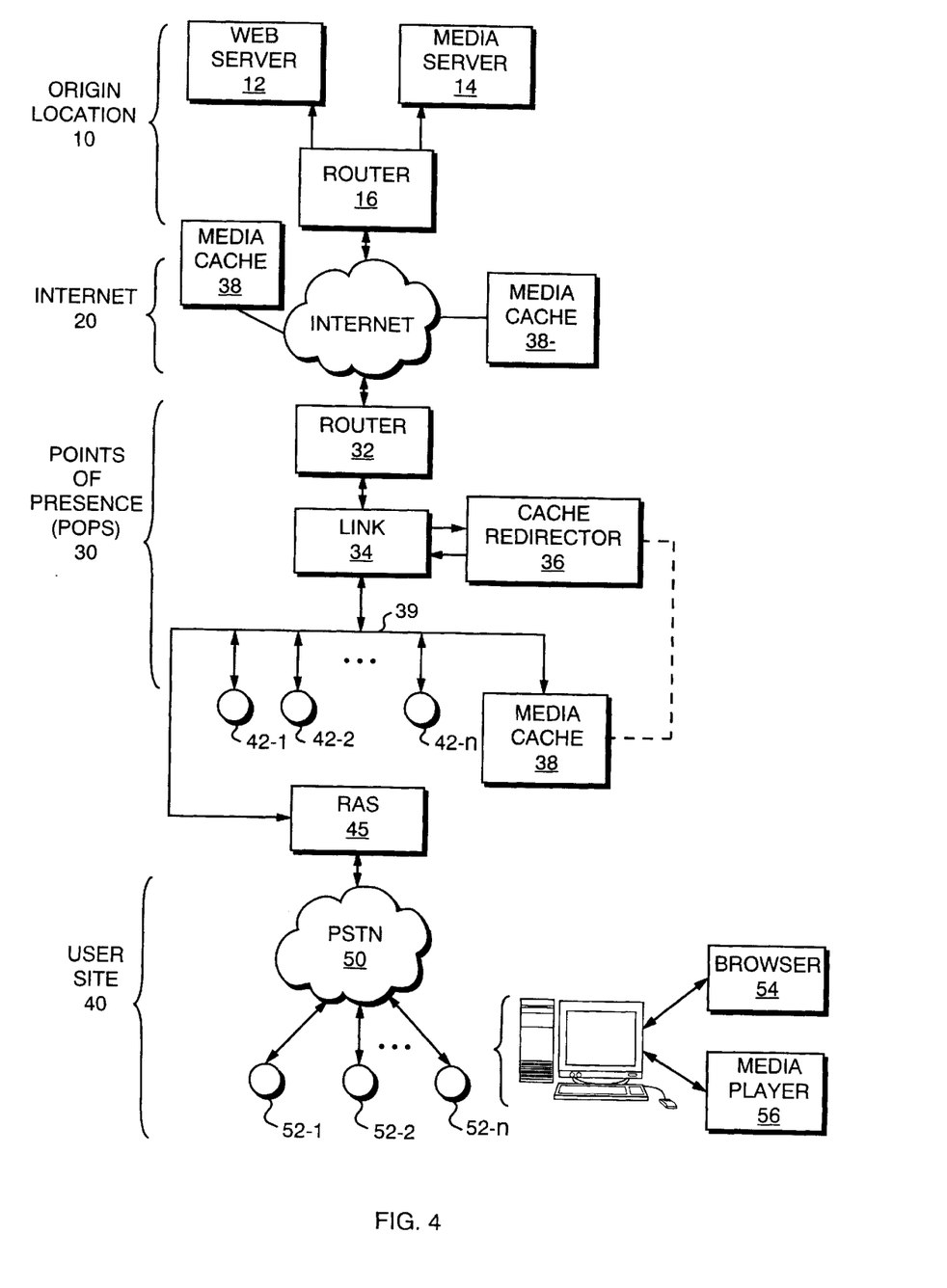
FIG. 4 is a modified system diagram showing media caches distributed throughout the network.

In a scenario such as shown in FIG. 4, media caches 38 may be distributed throughout various places in the network. The media server 14 keeps track of the URLs for these media caches 38. In such an instance, the media server 14 may return an MRF file containing not only the single specification of media server shown in FIG. 2, but multiple <href> references to other media servers.

Figure 5:
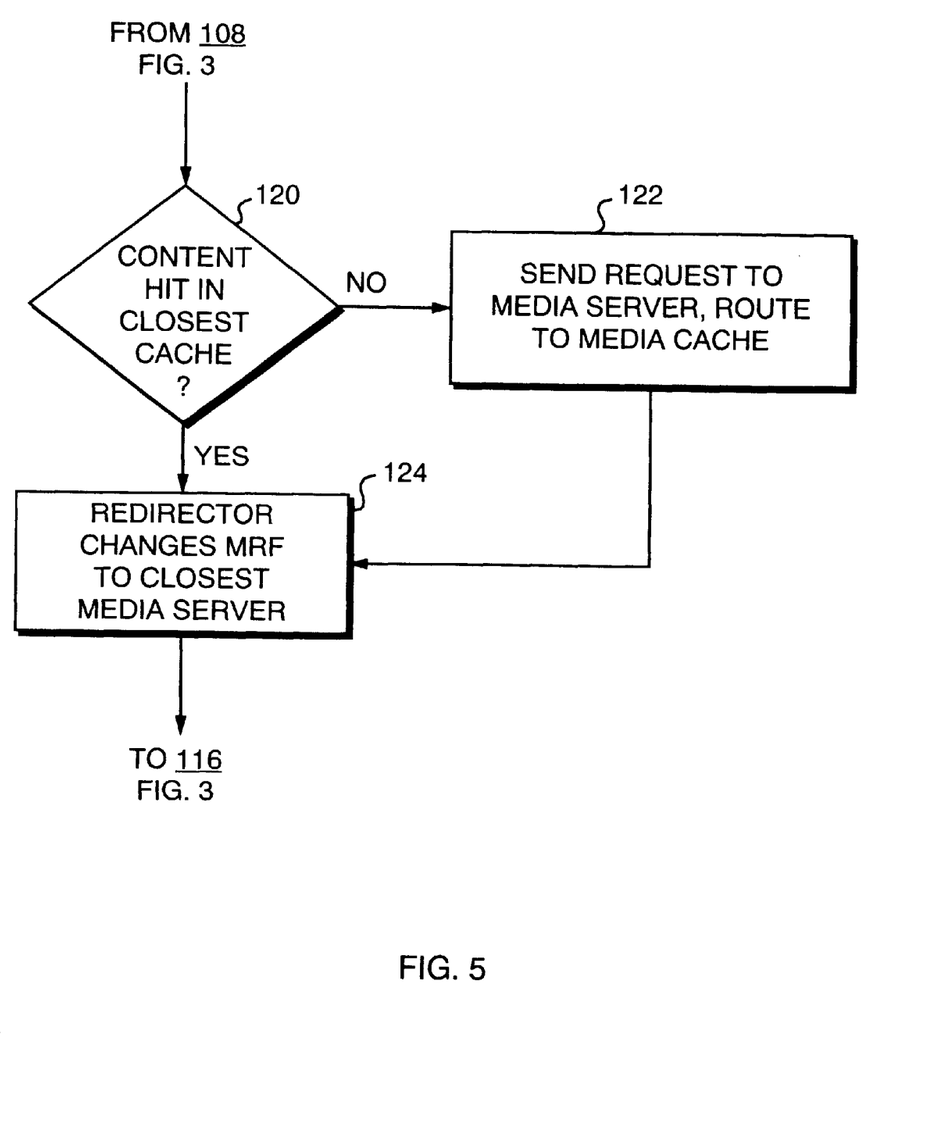
FIG. 5 is a modified series of steps performed in the environment of FIG. 4.

When the cache redirector 36 obtains such an MRF file with multiple media cache possibilities, as shown in the diagram of FIG. 5, from state 108 entering a state 120, it examines the MRF file to determine the closest media cache from the group of media caches 38 specified in the MRF file. In state 124, this enables the cache redirector 36 to obtain the requested streaming media file from the closest media cache 38 which it can access, avoiding access to the top level media server 14 as much as possible. The closest media cache may not necessarily be the physically closest but rather the cache with fastest relative access time. A state 122 routes any miss request to the closest cache.

In this scenario, the media server 36, rather than keeping track of where the content is located, may also be implemented by having various media caches 38 communicate with one another as to their contents. Techniques such as load balancing can also be used to further efficiently distribute frequently requested content throughout the network 10. What is important is that a set of possible media caches are presented to the cache redirector 36 and the cache redirector 36 has a selection method from which to choose among the various media caches 38.

The multiple media caches 38, for example, may cooperate to provide fault tolerance, clustering, or other aspects of the domain naming system which take advantage of the multi-processor environment.

It should also be understood that still other embodiments are possible. For example, if a media player is integrated into the browser program, then no MRF file need necessarily be routed to the browser 54. In this instance, a direct request for multimedia files can still be intercepted at the appropriate port connection with link layer redirection as described in FIG. 4.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of servicing requests for delivery of a media content file in a network of client-server computing systems in which a client computer makes an inquiry to an origin server to locate a media server associated with the origin server which stores the media content file, and wherein a local media cache is located within the network, the method comprising the steps of:

at the client, requesting delivery of the media content file by requesting from the origin server the delivery of a media redirection file (MRF) containing a redirection object specifying instructions for obtaining the media content file from the media server;

prior to delivery of the media redirection file from the origin server to the client, intercepting the media redirection file at a node on the network between the origin server and client;

rewriting instructions contained in the intercepted media redirection file; and sending the media redirection file including rewritten instructions to the client so that the media content file is obtained from the local media cache by the client instead of from the media server.

2. A method as in claim 1 wherein the step of intercepting the media redirection file is performed at a node in the network near the client.

3. A method as in claim 1 wherein the step of intercepting the media redirection file is performed at an intermediate node in the network.

4. A method as in claim 1 wherein the step of intercepting the media redirection file is performed at the origin server.

5. A method as in claim 1 wherein the step of intercepting the media redirection file is modified at a link layer.

6. A method as in claim 1 wherein the local media cache is selected from among multiple media caches.

7. A method as in claim 1 wherein the media content file is stored in the local media cache prior to the client requesting delivery of the media content file.

8. A method as in claim 1 additionally comprising the step of:

determining an observed link bandwidth for file transfers between the local media cache and the client; and rewriting the instructions in the media redirection file to specify one of a plurality of media content files depending upon the observed link bandwidth.

9. A method as in claim 6 wherein the multiple media caches are arranged and selected in accordance with a fault tolerance capability.

10. A method as in claim 1 wherein the multiple media caches are arranged as a cache cluster.

11. A method of servicing requests for delivery of a media content file in a network of client-server computing systems in which a client computer makes an inquiry to an origin server to locate a media server associated with the origin server which stores the media content file, and wherein a local media cache is located within the network at a point near the client, the method comprising the steps of:

at the client, requesting delivery of the media content file by requesting from the origin server the delivery of a media redirection file (MRU) containing a redirection object specifying instructions for obtaining the media content file from the media server;

prior to delivery of the media redirection file to the client, intercepting the media redirection file and rewriting the instructions contained therein so that the media content file is obtained from the local media cache by the client instead of from the media server directly; and charging the user of the client computer a premium for intercepting media redirection files.

12. A method as in claim 1 additionally comprising the step of:

before rewriting the instructions contained in the media redirection file, determining if the media content file is stored at the local cache server.

13. A method as in claim 1 wherein the step of rewriting the instructions further comprises the step of rewriting an <href> tag within the media redirection file to insert a Uniform Resource Location (URL) of the media cache.

14. A method of servicing requests for delivery of media content in a network of client-server computing systems, the method comprising the steps of:

transmitting a request from a client to a first server over the network;

in response to receiving the request, generating a file at the first server, the file including information indicating an address for retrieving media content associated with the request from the client;

sending the file over the network for receipt by the client;

prior to receipt of the file by the client, intercepting the file at a node of the network;

modifying the file at the node of the network; and forwarding the modified file to the client.

15. A method as in claim 14 further comprising:

processing the file at the client to identify an address associated with retrieving the media content; and retrieving the media content at the client from a different server than originally intended by the first server.

16. A method as in claim 14, wherein the file is a media redirection file (MRF) including a redirection object specifying instructions for obtaining the media content file from a media server.

17. A method as in claim 14, wherein the file generated by the first server indicates a second server from which the client should retrieve media content and the file is modified to indicate a third server from which the client should retrieve the media content.

18. A method as in claim 17, wherein the third server is a local cache server located at an intermediate node between the client and first server.

19. A method as in claim 14, wherein the media content is retrieved from a local cache server located in a vicinity of the node of the network intercepting the file.

20. A method as in claim 14 further comprising:

processing the file at the node of the network to determine whether a local media cache server includes the media content being requested by the client; and retrieving the media content by the client from the local cache media instead of as originally intended by the first server.

21. A method as in claim 20, wherein the server is a local media cache server disposed nearer the client than the originally intended server.

22. A method as in claim 20, modifying an address in the file so that media content is retrieved from a different server than originally intended by the first server generating the file.

23. A method as in claim 14 further comprising:
  determining that a local media cache does not include requested media content; and
  from the node intercepting the file, forwarding the file to the client so that the client retrieves the media content from a server as originally intended by the first server.

24. A method of servicing requests for delivery of media content in a network of client-server computing systems, the method comprising the steps of:
  at an origin server that generates media redirection files, receiving a request from a client for information related to specific media content;
  maintaining at least one media cache connected to the network to satisfy the request for media content, the at least one media cache including a copy of the media content that is optionally provided by an alternate media content server;
  selecting one of the at least one media cache to service the client request;
  generating a media redirection file to include an address of the selected media cache that will provide data to satisfy the request for media content; and
  sending the generated media redirection file to the requesting client.

25. A method as in claim 24, wherein multiple media caches are located at points of presence on the network.

26. A method as in claim 24, wherein the media redirection file is modified based on load balancing for efficient distribution of frequently requested media content.

27. A method as in claim 24 further comprising:
  charging a premium for modifying media redirection files.

28. A method as in claim 24 further comprising:
  examining the media redirection file;
  determining a closest media:cache in which the requesting client can access; and
  modifying the media redirection file to include a reference to the closest media cache that the requesting client can access.

29. A method as in claim 24, wherein the media content requested by the client is streaming data information.

30. A method as in claim 24 further comprising:
  identifying a media cache located at a point of presence that can satisfy the request for media content; and
  modifying the media redirection file to include a reference address to the media cache located at the point of presence to serve requesting client.

31. A method as in claim 24, wherein the origin server is a Domain Name Server (DNS) that resolves domain names to physical addresses.

32. A method as in claim 24, wherein the client requesting information related to the content media transmits messages across the Internet to communicate with the origin server.

33. A method as in claim 24 further comprising:
  examining the media redirection file;
  determining a media cache from which the requesting client can access most quickly; and
  modifying the media redirection file to include an address to the most quickly accessible media cache.

34. A method as in claim 24, wherein the step of modifying the media redirection file includes modifying an address from which media content will be retrieved.

35. A method as in claim 24 further comprising:
  a media redirection file so that the media content is provided by a media cache server that is more easily accessible by the client than the alternate media server.

* * * * *